United States Patent [19]

Razelli et al.

[11] Patent Number: 4,916,978
[45] Date of Patent: Apr. 17, 1990

[54] DIFFERENTIAL DEVICE OF THE LIMITED SLIP TYPE

[75] Inventors: Giovanni B. Razelli, Turin; Piero Buoncristiani, San Miniato, both of Italy

[73] Assignees: Ferrari Engineering S.p.A., Modena; Piaggio & C. S.p.A., Genoa, both of Italy

[21] Appl. No.: 264,727

[22] Filed: Oct. 31, 1988

[30] Foreign Application Priority Data

Oct. 30, 1987 [IT] Italy ................ 67917 A/87

[51] Int. Cl.⁴ .......................... F16H 1/38; F16H 1/42
[52] U.S. Cl. ..................................... 475/226; 475/249
[58] Field of Search .................................. 74/714, 715

[56] References Cited

U.S. PATENT DOCUMENTS

| 1,164,769 | 12/1915 | Walter | 74/715 |
| 1,195,314 | 8/1916 | Williams | 74/715 |
| 1,262,833 | 4/1918 | Nogrady | 74/715 |
| 1,310,976 | 7/1919 | Williams | 74/715 |
| 2,070,569 | 2/1937 | Asam | 74/715 |
| 2,666,343 | 1/1954 | Casa-Massa | 74/715 |

FOREIGN PATENT DOCUMENTS

| 871671 | 3/1953 | Fed. Rep. of Germany . | |
| 768330 | 8/1934 | France . | |
| 2576657 | 1/1986 | France . | |
| 540686 | 10/1941 | United Kingdom | 74/715 |
| 1316121 | 9/1973 | United Kingdom . | |

Primary Examiner—Dwight G. Diehl
Attorney, Agent, or Firm—Shlesinger & Myers

[57] ABSTRACT

The device comprises first and second planet wheels having a common axis, first and second pairs of first satellite gear wheels meshing respectively with the first and second planet wheels, the two gear wheels of each of the said pairs being rotatable on a differential housing coaxial with the planet wheels and having axes lying respectively in first and second planes orthogonal to one another and passing through the first-mentioned said common axis; the device further includes two pairs of second satellite gear wheels also rotatable on the differential housing and having axes lying in the same plane orthogonal to the first and second first-defined planes, each of the second satellite gear wheels meshing simultaneously with one of the said first satellite gear wheels belonging to the first pair and with one of the said first satellite gear wheels belonging to the second pair in such a way that drive can be transmitted from one of the said first satellite gear wheels of one of the said pairs simultaneously to two of the said first satellite gear wheels of the other of the said pairs through a pair of the said satellite gear wheels.

12 Claims, 5 Drawing Sheets

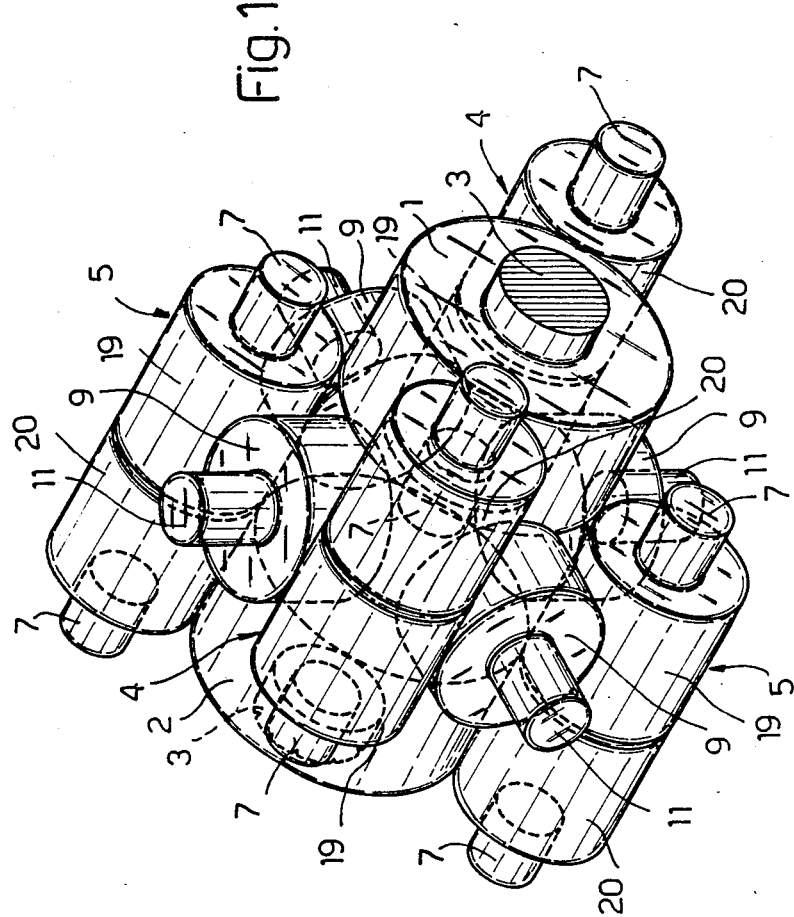

DIFFERENTIAL DEVICE OF THE LIMITED SLIP TYPE

BACKGROUND OF THE INVENTION

The present invention relates to a differential device of the limited slip type for motor vehicles, by means of which drive to the two wheels of an axle of the motor vehicle can be transmitted whilst avoiding the possibility that when one of these wheels reaches the limit of adhesion it can accelerate sharply consequently unfavourably influencing the operating conditions of the motor vehicle or preventing this from moving with respect to the ground.

As is known, differential devices of this type normally comprise a pair of toothed planet wheels each of which is connected to an axle of the motor vehicle and which are connected together by means of a kinematic chain in which there is at least one pair of toothed wheels of low inherent efficiency or a pair of toothed wheels which do not allow reverse drive; normally this pair is constituted by a worm screw and a helically toothed gear wheel.

A first differential device of this type, known as a Torsen differential, comprises a pair of worm screws each of which constitutes a toothed planet wheel of the differential, and three pairs of helically toothed satellite wheels each of which is carried by the differential housing and is rotatable with respect thereto on an axis which lies in a plane orthogonal to the axis of the toothed planet wheels. Each of the said helical gears of the pair mesh with a corresponding worm gear and is fixed to at least one cylindrically toothed wheel which in turn meshes with the cylindrically toothed wheel to which the other helically toothed gear wheel of the same pair is fixed.

With this constructional arrangement, when the vehicle runs in a curve, the wheels can assume a different angular velocity since each worm gear (to which one of the wheels is fixed) is able to transmit drive to the corresponding helical gear, whilst sharp acceleration of a wheel when this reaches the limit of adhesion is prevented since, if this anomalous condition of operation should occur, one of the two worm gear-helical gear pairs must rotate with reversed drive, which is prevented by the geometry of the teeth of the pair itself.

Differential devices of this type have several disadvantages.

First of all, very high torques cannot be transmitted with these because of the known stresses which are produced in some regions of the teeth of the gear pairs and the differential housing. In fact, torque is transmitted from the differential housing to each of the axles through the forces which are exchanged between each worm gear fixed to the associated axle and the corresponding helical gears: this torque cannot be very high because of the limited number of meshing zones between each worm gear and the corresponding helical gear (three meshing zones) and the small contact areas in each of the said zones. Moreover, high stresses are also manifest at the seats of the differential housing in which the toothed satellite gears are rotatable because of the limited dimensions of the seats themselves and the form of the casing imposed by the structure of the mechanism. The radial dimensions of such a differential device are very high because of the arrangement of the axes of the toothed satellite wheels which, as has been stated, lie in planes orthogonal to the axis of the differential.

Finally, the operations necessary for assembly of such a device are complex and require particulare care.

SUMMARY OF THE INVENTION

The object of the present invention is that of providing a differential device of the limited slip type by means of which is is possible to eliminate the above mentioned disadvantages and, therefore, by means of which it is possible to transmit very high torques with a mechanism of small dimensions particularly in the radial direction.

According to the present invention there is therefore provided a differential device of the limited slip type for motor vehicles, comprising a first and a second toothed cylindrical planet wheel having a common axis, first and second pairs of first cylindrical satellite gear wheels meshing respectively with the said first and second planet gear wheels, the two gear wheels of each of the said pairs being rotatable on a differential housing coaxial with the said planet wheels and having axes lying respectively in a first and in a second plane orthogonal to one another and passing through the said common axis, at least two pairs of second satellite gear wheels also rotatable on the said differential housing and having axes lying in the same plane orthogonal to the said first and second plane, each of the said second satellite gear wheels meshing simultaneously with one of the said first satellite gear wheels belonging to the first of the said pairs and with one of the said first satellite gear wheels belonging to the second of the said pairs in such a way that drive can be transmitted from one of the said first satellite gear wheels of one of the said pairs simultaneously to two of the said first satellite gear wheels of the other of the said pairs through one pair of the said satellite gear wheels.

BRIEF DESCRIPTION OF THE DRAWINGS

For a better understanding of the present invention a more detailed description of it will now be given with reference to the attached drawings, in which:

FIG. 1 is a schematic perspective view of the drive train formed with the differential device of the invention;

DETAILED DESCRIPTION OF THE INVENTION

Figure 3:
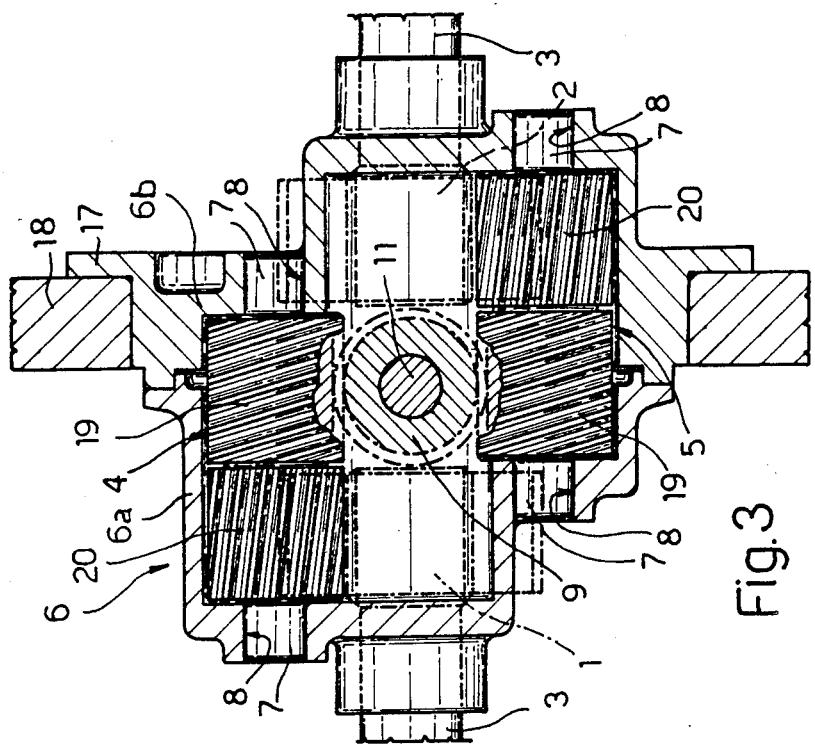
FIG. 3 is a section of the differential of FIG. 2 taken on the line III—III.

The device of the invention substantially comprises first and second toothed cylindrical planet wheels having common axes and indicated 1 and 2, to each of which is connected a corresponding half-shaft 3 of an axle of the motor vehicle; a first and a second pair of cylindrical satellite gear wheels, respectively indicated 4 and 5, of which those of the first pair 4 mesh, as is clearly seen in FIG. 1, with the first planet wheel 1, whilst those of the second pair 5 mesh with the second planet wheel 2.

Figure 4:
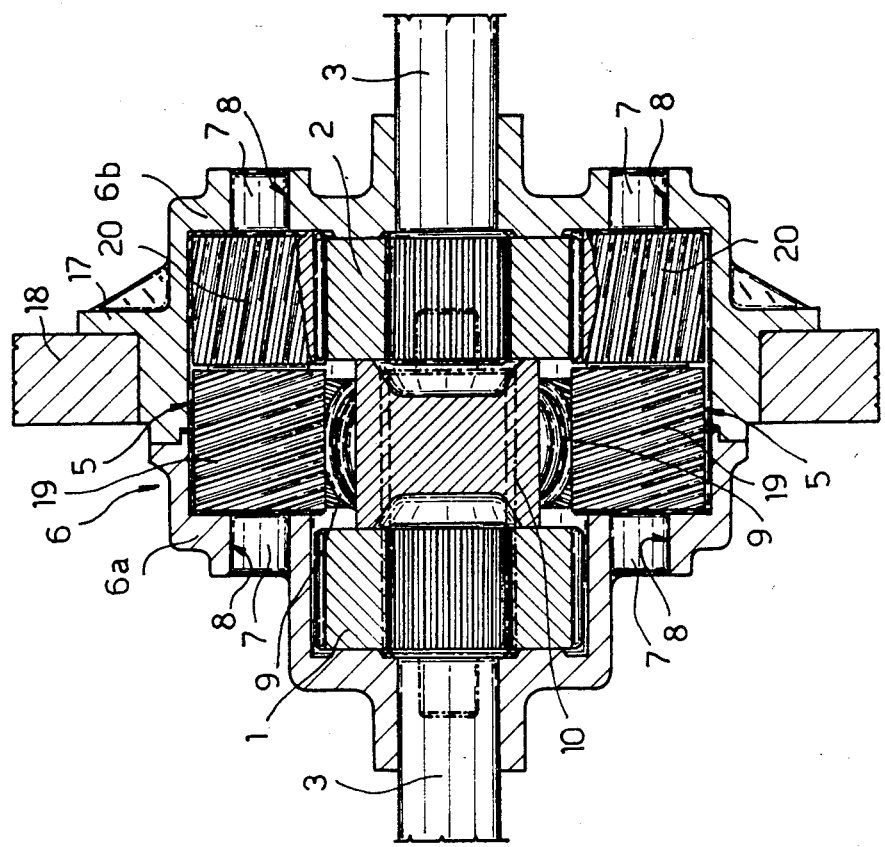
FIG. 4 is another section of the differential of FIG. 2 taken on the line IV—IV.

The two gear wheels 4 and 5 of each of these pairs are rotatable on a differential housing, indicated 6 (FIGS. from 2 to 5) which is coaxial with the planet wheels 1 and 2; moreover the axes of the satellite gear wheels 4 of the first pair lie in a first plane which passes through the common axis of the planet wheels 1 and 2, whilst the axes of the satellite gear wheels 5 of the second pair lie in another plane orthogonal to the first and also passing through the first-defined common axis. Conveniently to allow support and rotation of the satellite gear wheels 4 and 5 with respect to the differential housing 6 they are provided with terminal pins 7 housable in corresponding seats 8 formed in the said casing as is clearly seen in FIGS. 3 and 4.

The device further includes at least two pairs of second satellite gear wheels indicated 9 (FIG. 1) also rotatable on the differential housing 6, and having axes lying in the same plane orthogonal to the axis of the differential and therefore to the first-defined planes which contain the axes of the satellite gear wheels 4 and 5.

Each of the satellite gear wheels 9 meshes, simultaneously, with one of the satellite gear wheels 4 and with one of the satellite gear wheels 5, in such a way that drive is transmitted from each satellite gear wheel 4 (or 5) simultaneously to two satellite gear wheels 5 (or 4) by means of a pair of satellite gear wheels 9.

Figure 5:
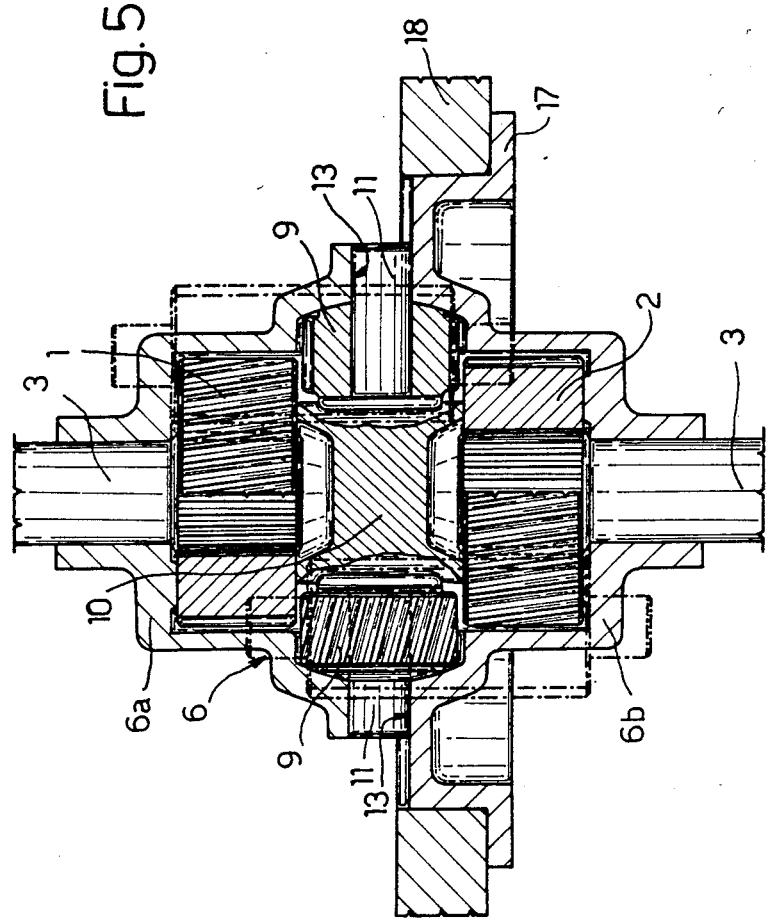
FIG. 5 is a further section of the differential of FIG. 2, taken on the line V—V.

Conveniently, for support of the satellite gear wheels 9 there can be utilised a cruciform member 10 provided with four arms 11 each of which is orthogonal to the two contiguous arms; each of the satellite gear wheels 9 is rotatable on one of the arms 11 and the end of each of these is housed in a corresponding seat 13 (FIG. 2) of the differential housing 6. Conveniently this casing includes at least two parts 6a and 6b (FIGS. 3, 4 and 5) joined together substantially along the plane in which the axes of the arms 11 of the cruciform member 10 lie, as is clearly seen in FIG. 3. The differential housing 6 is moreover provided with a flange 17 for fixing it to a crown wheel 18 able to cause rotation of the housing itself.

Each of the satellite gear wheels 4 and 5 comprise a first toothed portion, indicated 19, which meshes with the teeth of a corresponding satellite gear wheel 9 and is able to form with the teeth of this latter a gear pair of low internal efficiency. A pair of this type can be conveniently formed by helical teeth of the type usually utilised to transmit motion between skew axes.

Alternatively, each of the satellite gear wheels 4 and 5 comprises a first toothed portion 19 which meshes with the teeth of a corresponding satellite toothed wheel 9 and is able to form with the teeth of this latter a gear pair which does not allow the transmission of reversed drive, that is to say of the type in which the drive can be transmitted from one gear to the other only when a predetermined gear of the pair is driven, whilst transmission of motion is not possible when, on the other hand, the other gear is driven. In this case the first toothed portion 19 can be constituted by a worm screw and each satellite gear wheel 9 can be constituted by a helical gear. The teeth of the helical gear 9 can be delimited by a cylindrical external interrupted surface or else by a surface of revolution having a circular arc as a generating curve.

If the said pair is constituted by a worm screw and worm wheel the angle between the axis of the threads of the screw with the axis of the screw itself lies conveniently between 40° and 60°; particularly favorable results have been achieved by choosing this angle equal to 52°.

Each of the planet wheels 1 and 2 can be provided with straight teeth or helical teeth; each satellite gear wheel 4 and 5 is provided with a second toothed portion 20 which is constituted, in the first case, by straight teeth and, in the second, by helical teeth. If the teeth of the toothed portion 20 are helical, the inclination of the axes of the two toothed portions 19 and 20 can be the same or can be different, obtaining, in the first case, with the toothed portions 19 and 20 a substantially single continuous toothing and, in the second, two different toothings.

The operation of the differential device described is as follows:

When the motor vehicle travels along a rectilinear path the angular velocities of the two plane wheels 1 and 2 are the same and therefore drive is transmitted from the crown wheel 18 fixed to the differential housing 6 to these planet wheels through the mechanical connection formed by the satellite gear wheels 4, 5 and 9 which, in these operating conditions, do not rotate with respect to the differential housing but constitute substantially a rigid coupling therewith.

If, on the other hand, the vehicle travels along a curved path, because of the different angular velocity of the two wheels, a relative angular velocity is created between the planet wheels 1 and 2 and therefore the planet wheel 1 causes the satellite gear wheels 4 to rotate, whilst the planet wheel 2 causes the satellite gear wheels 5 to rotate, in this way carrying the satellite gear wheels 9 into rotation. The transmission of drive from the worm 19 to the helical wheel 9 of each pair is possible since the first element of the pair is the drive member.

If it is now supposed that one of the two wheels move to reach the limit of adhesion, for example that which is connected to the half-shaft fixed to the planet wheel 1, this half-shaft, and therefore the planet wheel 1, would tend to accelerate rapidly; it can easily be seen that this anomalous operating condition cannot occur with the differential device of the invention. In fact a rapid acceleration of the planet wheel 1 would tend to produce a corresponding acceleration of the satellite wheels 4 with which it meshes; the rotation of these satellite wheels which would be involved would also be transmitted to the satellite wheel 9, but from this it could not be transmitted to the satellite wheels 5 since in each gear pair constituted by a helical gear wheel 9 and one worm gear 19 the first element of the pair itself would be the driving member, which is not able to transmit drive to the other element; in fact, as has been indicated above, such a pair does not allow transmission of reverse motion. Consequently, therefore, even when one of the two wheels of the axis driven by the differential reaches the limit of adhesion, the typical anomalous operating condition of conventional differentials, in which one of the wheels slips with respect to the ground, or where only the slipping wheel turns whilst the other is stationary, does not arise.

The torques which can be transmitted with the differential device of the invention are very high; this favorable result derives from the fact that the toothed portion 19 of each of the satellite wheels 4 (or 5) transmits its drive simultaneously to two satellite gear wheels 5 (or 4) through a pair of satellite gear wheels 9; in other words, there are, overall, four meshing zones between the toothed portions 19 of the satellite gear wheels 4 and the satellite gear wheels 9 and, similarly, four meshing zones between these latter satellite gear wheels and the satellite gear wheels 5. Therefore the overall torque which is transmitted through the forces exchanged in the said four meshing zones is very high.

Figure 2:
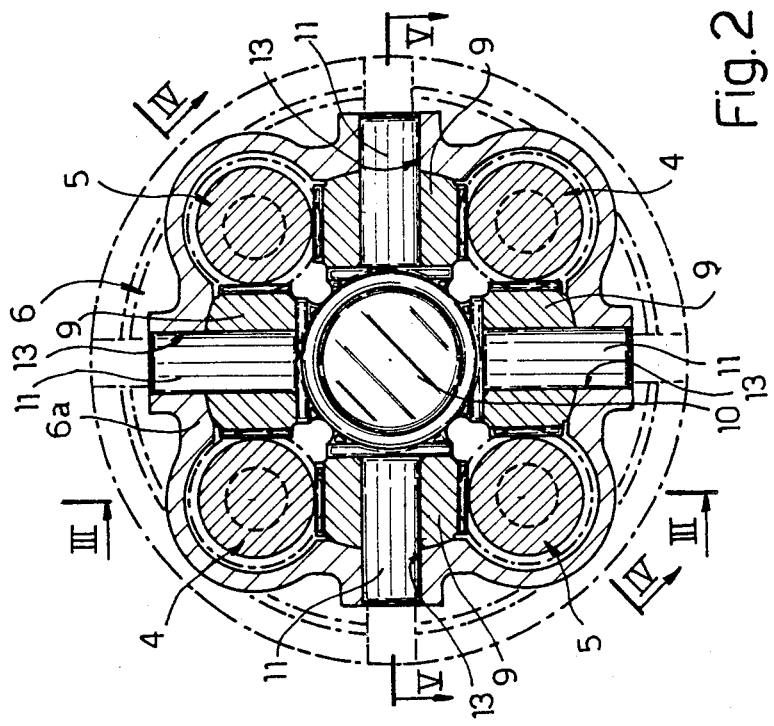
FIG. 2 is a transverse section of the differential of the invention.

Moreover, the dimensions of the differential device are very modest, in particular the radial dimension: this favorable result can be seen easily from the section of FIG. 2 in which it can be observed how the four spaces which lie between the satellite gear wheels 4 and 5 are completely occupied by the satellite gear wheels 9.

Figure 6:
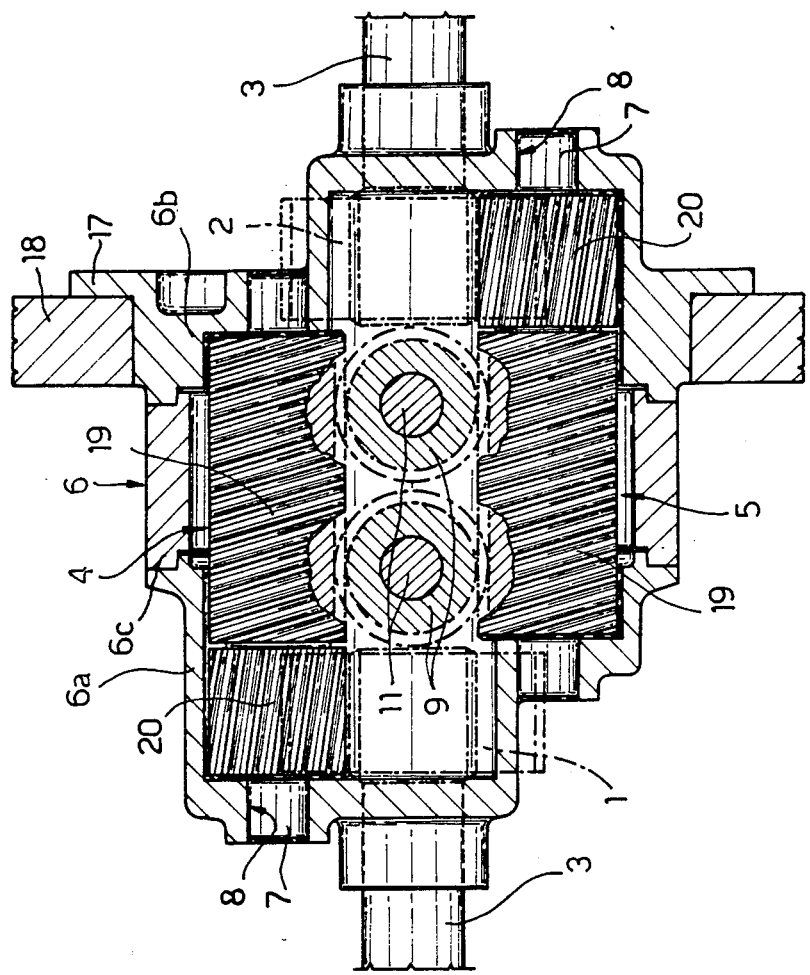
FIG. 6 is a section through the differential, similar to that of FIG. 3, corresponding to a second embodiment thereof.

If the torque to be transmitted by the differential device of the invention is very high the constructional arrangement illustrated in FIG. 6 can be chosen, in which there are provided two different series of satellite gear wheels 9 (each series comprising as in the preceding case two pairs of wheels), meshing with the satellite gear wheels 4 and 5; the axes of the satellite gear wheels of each series are contained in the same plane orthogonal to the axis of the planetary gear wheels 1 and 2 and, for the purpose of allowing meshing with these two series of satellite gear wheels 9, the axial length of the toothed portion 19 of the satellite gear wheels 4 and 5 is greater than that which is found in the case of the previously described embodiment. To achieve this second embodiment simple and obvious variants must be introduced, in particular to the differential housing 6, which can comprise, as well as the parts 6a and 6b, a further part 6c (FIG. 6) which is connected to the others along a junction plane coinciding substantially with those first defined, in which the axes of the gear wheels of the two series are disposed. In this constructional arrangement the crown wheel 18 is preferably fixed to the part 6b with the advantage of rendering the parts 6a and 6c identical to one another.

The mechanical strength of the differential device of the invention is very great, in particular the forces which are applied to the satellite gear wheels 4, 5 and 9 are supported by memebers or parts which are able to withstand such forces; in fact the forces acting on the satellite gear wheels 9 are supported by the cruciform member 10 and by the differential housing 6 through the seats 13, and these are applied to the satellite gear wheels 4 and 5 from the housing itself through the seats 8 which can have a large contact area.

It is clear that the differential device described can have modifications and variations introduced thereto without by this departing from the ambit of the invention.

We claim:

1. A differential device of the limited slip type for motor vehicles, comprising first (1) and second (2) toothed cylindrical planet wheels having a common axis, first (4) and second (5) pairs of first cylindrical satellite gear wheels meshing respectively with said first and second planet wheels, the two gear wheels of each of said pairs being rotatable in a differential housing (6) and having axes lying respectively in a first and in a second plane orthogonal to one another and passing through said common axis, said housing (6) being coaxial with said planet wheels (1, 2), at least two parallel sets of two pairs of second satellite gear wheels (9) also rotatable on said differential housing and having axes lying in third and fourth planes orthogonal to said common axis, each of said second satellite gear wheels (9) meshing simultaneously with one of said first satellite gear wheels belonging to first of said pairs (4) and with one of said satellite gear wheels belonging to the second (5) of said pairs, in such a way that drive can be transmitted from one of said first satellite gear wheels of one of said pairs (4, 5) simultaneously to two of said first satellite gear wheels of the other (5, 4) of said pairs through a pair of said second satellite gear wheels (9).

2. A differential device according to claim 1, characterized by the fact that each of said first satellite gear wheels (4, 5) includes a first toothed portion (19) and a second toothed portion (20), said first toothed portion (19) meshes with the teeth of a corresponding second satellite gear wheel (9) and which is able to form with said teeth of the second satellite gear wheel a gear pair of low internal efficiency.

3. A differential device according to claim 2, characterized by the fact that said first toothed portion (19) of said first satellite gear wheels (4, 5) and said teeth of said second satellite gear wheel (9) are helical.

4. A differential device according to claim 3, characterized by the fact that the inclination of the teeth of said first and second helically toothed portions (19, 20) of said first satellite gear wheels is different.

5. A differential device according to claim 1, characterized by the fact that each of said first satellite gear wheels (4, 5) includes a first toothed portion (19) which meshes with the teeth of a corresponding second satellite gear wheel and which is able to form with said teeth of the second satellite gear wheel a gear pair which allows the transmission of direct drive and prevents the reverse transmission of drive, that is to say drive in the opposite sense from forward drive.

6. A differential device according to claim 5, characterized by the fact that said first toothed portion (19) of said first satellite gear wheels (4, 5) is constituted by a worm gear and each second satellite gear wheel (9) is constituted by a helical gear able to mesh with a corresponding worm gear.

7. A differential device according to claim 6, characterized by the fact that the angle formed between the threads of each of said worm gears with the axis of the worm itself lies betwen 40° and 60°.

8. A differential device according to claim 1, characterized by the fact that each of said planet wheels (1, 2) is provided with helical teeth adapted to mesh with a second helical toothed portion (20) of one of said first satellite gear wheels (4, 5).

9. A differential device according to claim 1, characterized by the fact that it includes at least one cruciform member (10) having four arms (11) each of which is orthogonal to the two contiguous arms and each of said second satellite gear wheels (9) is rotatable on one of said arms, the end of each of said arms being housed in a corresponding seat (13) of said differential housing (6).

10. A differential device according to claim 1, characterized by the fact that said differential housing (6) comprises at least two parts (6a, 6b) joined together, said two parts being joined together, substantially along the plane in which the axes of said arms (11) of the cruciform member lie.

11. A differential device according to claim 1, characterized by the fact that each of said first satellite gear wheels (4, 5) has a pair of end pins (7) housed in corresponding seats (8) formed in said differential housing (6).

12. A device according to claim 1, characterized by the fact that said differential housing (6) comprises three parts (6a, 6b, 6c) joined together along planes parallel to those in which the axes of the arms (11) of the cruciform member lie, the part (6b) being fixed to a crown wheel (18) for transmitting drive to the housing itself.

* * * * *